United States Patent Office 3,544,550
Patented Dec. 1, 1970

3,544,550
NON-OXO-CARBONYLIC CONTAINING,
PHENYL-AZO-PHENYL DYESTUFFS
Catherine Margaret Anderton, Brian Ribbons Fishwick, and John Lawson, Manchester, England, assignors to Imperial Chemical Industries Limited, Millbank, London, England, a corporation of Great Britain
No Drawing. Filed July 12, 1967, Ser. No. 652,706
Claims priority, application Great Britain, July 15, 1966, 31,920/66
Int. Cl. C07c 107/06; C09b 29/06
U.S. Cl. 260—207.1
2 Claims

ABSTRACT OF THE DISCLOSURE

Water-insoluble azo dyestuffs derived from diazo components, which are preferably of the benzene series, and as coupling components optionally substituted anilines carrying as N-substituent a substituted alkoxycarbonyl-alkyl radical, and the use of the said dyestuffs for coloring synthetic textile materials.

---

This invention relates to azo dyestuffs, and more particularly it relates to water-insoluble azo dyestuffs which are valuable for colouring synthetic textile materials in particular polyester textile materials.

According to the invention there are provided the water-insoluble azo dyes of the formula:

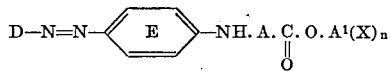

wherein D is the radical of a diazo component, A is a divalent alkane radical containing from 1 to 4 carbon atoms, $A^1$ is a di- or tri-valent alkane radical containing from 1 to 4 carbon atoms, $n$ is 1 or 2, X is cyano, arylsulphonyl, lower alkylsulphonyl, carbo lower alkoxy, aryloxycarbonyl, aralkyloxycarbonyl, cyclohexyloxycarbonyl, carbonamido, acyl; acyloxy, acylamino, amino, alkylamino or dialkylamino radical, and the benzene ring E may carry substituents, provided that the dyestuffs are free from sulphonic acid and carboxylic acid groups.

The radical of a diazo component represented by D is preferably the radical of a diazo component of the naphthalene, thiazole, benzthiazole, thiadiazole, thiophene and, above all, benzene series. If desired the radical represented by D can contain another azo group or groups, so that the azo dyestuffs of the invention are monoazo or polyazo dyestuffs. It is however preferred that the said dyestuffs are monoazo dyestuffs.

As examples of the radicals represented by A and $A^1$ there may be mentioned methylene, trimethylene, propylene, tetramethylene and, above all, ethylene radicals. It is preferred that $n$ is 1 so that A and $A^1$ each independently represent lower alkylene radicals having from 1 to 4 carbon atoms.

As examples of substituents which may be present on the benezene ring E there may be mentioned chlorine, bromine, trifluoromethyl, lower allyl in particular methyl, lower alkoxy in particular methoxy or ethoxy, and acylamino in particular acylamino groups of the formula —NR—COZ wherein R is hydrogen or lower alkyl, and Z is hydrogen, lower alkyl or optionally substituted phenyl.

Throughout this specification the terms "lower alkyl" and "lower alkoxy" are used to denote alkyl and alkoxy radicals respectively containing from 1 to 4 carbon atoms, such as methyl, ethyl, n-propyl, isoproypl, n-butyl, sec-butyl, tert-butyl, methoxy, ethoxy, isopropoxy, n-propoxy, n-butoxy, sec-butoxy and tert-butoxy radicals.

Preferred values of X are cyano, carbo lower alkoxy, carbonamindo, acyloxy in particular lower alkylcarbonyloxy, and acylamino in particular lower alkyl CONH—.

As examples of the different radicals represented by X there may be mentioned arylsulphonyl radicals in particular monocyclic arysulphonyl such as benzenesulphonyl and p-toluenesulphonyl radicals, lower alkylsulphonyl radicals, such as methanesulphonyl and ethanesulphony radicals, carbo lower alkoxy radicals such as carbomethoxy, carboethoxy and carbo-n-propoxy radicals, monocyclic aryloxycarbonyl radicals such as phenoxycarbonyl and p-methylphenoxycarbonyl radicals, aralkyloxycarbonyl radicals, such as the benzloxycarbonyl radicals, alkylamino radicals in particular lower alkylamino radicals such as methylamino and ethylamino radicals, and dialkylamino radicals in particular di(lower alkyl)amino radicals such as dimethylamino and diethylamino radicals. The acyl groups present in the acyl, acyloxy and acylamino radicals represented by X are preferably acyl groups derived from optionally further substituted hydrocarbon carboxylic acids or sulphonic acids, and in particular the said radicals are radicals of the formulae: Y.CO—, $YSO_2$—, Y.CO.O—, $Y.SO_2O$—, —NRCOY and —$NRSO_2Y$ wherein R is hydrogen or lower alkyl and Y is a substituted or unsubstituted hydrocarbon radical, in particular a substituted or unsubstituted lower alkyl or monocyclic aryl radical. As specific examples of the said acyl, acyloxy, and acylamino radicals represented by X there may be mentioned acetyl, propionyl, benzoyl, formylamino, acetylamino, benzylamino, p-chlorobenzoylamino, p-nitrobenzoylamino, benzenesulphonyl, benzenesulphonylamino, methylsulphonyloxy, methylsulphonamido, ethoxycarbonyloxy, methylureido and phenylcarbamoyloxy.

According to a further feature of the invention there is provided a process for the manufacture of the water-insoluble azo dyestuffs, as hereinbefore defined, which comprises coupling a diazotised primary amine of the formula D—$NH_2$ with a coupling component of the formula:

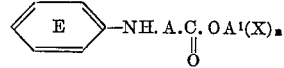

Formula I wherein A, $A^1$, D, E, X and $n$ have the meanings stated above, provided that the amine and coupling component are free from sulphonic acid and carboxylic acid groups.

The process of the invention may be conveniently brought about by adding an aqueous solution or suspension of the diazotised primary amine to a solution of the coupling component in a dilute aqueous solution of an acid such as hydrochloric acid or in a water-soluble organic liquid such as acetone, stirring the resulting mixture, preferably at a pH between 1 and 4, to effect formation of the monoazo dyestuff, and finally isolating the monoazo dyestuff by conventional methods.

The diazotised primary amines of the formula D—$NH_2$ used in the process of the invention are preferably diazotised primary amines of the naphthalene, thiazole, benzthiazole, thiadiazole, thiophene and, above all, benzene series.

As specific examples of the primary amines of the benzene series there may be mentioned aniline, o-, m- or p-toluidine, o-, m- or p-anisidine, o-, m- or p-chloroaniline, o-, m- or p-bromoaniline, o-, m- or p-nitroaniline, 2:5-dichloroaniline,
2:4-dinitroaniline,
2:4-dinitro-6-(chloro or bromo)aniline,
4-methanesulphonylaniline,
4-aminobenzotrifluoride,
4- or 5-nitro-2-toluidine,
4- or 5-nitro-2-anisidine, 4- or 5-chloro-2-anisidine,
4- or 5-chloro-2-toluidine,
4- or 5-bromo-2-anisidine,
2:6-di(chloro- or bromo)-4-nitroaniline,
2:4:6-trinitroaniline,
2:4-dinitro-6-carbomethoxyaniline,
2-amino-5-nitrobenzotrifluoride,
2:4-bis(methanesulphonyl)aniline,
2-(chloro- or bromo-)-4-nitroaniline,
methylanthranilate,
4- or 5-nitromethylanthranilate,
4-aminobenzamide,
2:6-di(chloro- or bromo-)aniline-4-sulphonamide,
2:6-di(chloro- or bromo-)-4-methylsulphonylaniline,
2:5-di(chloro- or bromo-)-4:6-dinitroaniline,
2-amino-3:5-dinitrobenzotrifluoride,
3-amino-2-(chloro- or bromo-)-4:6-dinitro(toluene or anisole),
3-amino-4-(chloro- or bromo-)-2:6-dinitro(toluene or anisole),
2- or 4-cyanoaniline,
4-nitro-2-cyanoaniline,
2:4-dinitro-6-cyanoaniline,
2-nitro-4-cyanoaniline,
2-chloro-4-cyanoaniline,
3-amino-2:4:6-trinitrotoluene,
2-(chloro- or bromo-)-4-methylsulphonylaniline,
2-(chloro- or bromo-)-4-thiocyanatoaniline,
2-(chloro- or bromo-)-4-sulphamylaniline,
2-amino-5-nitrophenylmethylsulphone,
2-amino-3:5-dinitrophenylmethylsulphone,
2-amino-3-(chloro- or bromo-)-5-nitrophenylmethylsulphone,
2-sulphamyl-4-nitroaniline,
2-methylsulphamyl-4-nitroaniline,
2-ethylsulphamyl-4-nitroaniline,
2-butylsulphamyl-4-nitroaniline,
2-dimethylsulphamyl-4-nitroaniline,
2-methylsulphamyl-4:6-dinitroaniline,
2-methylsulphamyl-4-nitro-6-(chloro- or bromo-)-aniline,
2-phenylsulphamyl-4-nitroaniline,
methyl 2-amino-3-(chloro- or bromo-)-5-nitrobenzoate,
methyl 2-amino-3:5-dinitrobenzoate,
dimethyl-2-aminoterephthalate,
dimethyl 2-amino-5-nitroterephthalate,
4-aminoazobenzene and
4-amino-2:5-dimethoxyazobenzene.

As specific examples of the primary amines of the naphthalene series there may be mentioned 1-naphthylamine-4-sulphonamide, 4-methylsulphonyl - 1 - naphthylamine, 6-(N-methylsulphamyl) - 2 - naphthylamine and 4-phenylazo-1-naphthylamine.

As specific examples of the primary amines of the thiazole series there may be mentioned 2-aminothiazole, 5-nitro-2-aminothiazole, 4-methyl-5-nitro - 2 - aminothiazole, 4-phenyl - 5 - nitro-2-aminothiazole and 2-amino-5-methylsulphonylthiazole.

As specific examples of the primary amines of the benzthiazole series there may be mentioned 2-aminobenzthiazole, 6-(methoxy or ethoxy)-2-aminobenzthiazole, 2-amino-6-methylsulphonylbenzthiazole, 2-amino - 6 - nitrobenzthiazole, 2-amino - 6 - thiocyanatobenzthiazole, 2-amino-6-cyanobenzthiazole and 2-amino - 6 - (β-hydroxyethylsulphonyl)benzthiazole.

As specific examples of the primary amines of the thiadiazole series there may be mentioned 2-amino-5-methyl-1:3:4-thiadiazole, 2-amino - 5 - phenyl-1:3:4-thiadiazole, 5-amino - 3 - phenyl - 1:2:4 - thiazole and 5-amino-3-methyl-1:2:4-thiadiazole.

As specific examples of the primary amines of the thiophene series there may be mentioned 2-amino-3-nitro-5-acetylthiophene and 2-amino-3-nitro-5-benzoylthiophene.

The coupling components of Formula I may themselves be obtained by condensing the appropriate primary amine of the formula $$\langle E \rangle -NH_2$$

with one molecular proportion of an acid of the formula: Cl.A.COOH or the appropriate α:β-unsaturated carboxylic acid, and esterifying the resulting compound of the formula:

$$\langle E \rangle -NH.A.COOH$$

with an alcohol of the formula: $HO.A^1(X)_n$ in the presence of sulphuric acid at a temperature between 60° and 120° C., or by reacting the sodium salt of a compound of the formula $$\langle E \rangle -NH.A.COOH$$

with a compound of the formula: $hal.A^1(X)_n$ wherein "hal" is chlorine or bromine.

As specific examples of the coupling components of Formula I there may be mentioned 2-chloro-5-methyl N-[β - (β' - cyanoethoxycarbonyl)ethyl]aniline, N-[β-(β'-cyanoethoxycarbonyl)ethyl]aniline, 2 - methoxy - 5-methyl-N - [β - (β'-dimethylaminoethoxycarbonyl)ethyl] aniline, 2 - chloro - N - [β-(β'-phenylsulphonylcarbonyl) ethyl]aniline and N - [β - (β' - ethylsulphonylethoxycarbonyl)ethyl]aniline.

According to a further feature of the invention there is provided an alternative process for the manufacture of the azo dyestuffs of the invention which comprises reacting an azo compound of the formula:

$$D-N=N-\langle E \rangle -NH.ACOOL$$

Formula II with an alcohol of the formula: $HO.A^1(X)_n$, wherein A, $A^1$, D, E, X and $n$ have the meanings stated and L is hydrogen or lower alkyl.

The process of the invention can be conveniently brought about by heating the reactants together in the presence of an esterification or trans-esterification catalyst such as sulphuric acid. The resulting dyestuff can then be isolated by conventional methods, for example by pouring the reaction mixture into water, and filtering off the precipitated dyestuff.

As examples of the said alcohols there may be mentioned β-cyanoethanol and β-acetoxyethanol.

The azo compounds of Formula II can themselves be obtained by coupling a diazotised amine of the formula: $D-NH_2$ with a coupling component of the formula:

$$\langle E \rangle -NH.A.COOL$$

Alternatively the azo dyestuffs of the invention can be obtained by reacting an alkali metal salt of an azo compound of Formula II, wherein L is a hydrogen atom, with a compound of the formula: $hal-A^1(X)_n$, wherein $A^1$, T, $n$ and X have the meanings stated, and "hal" is chlorine or bromine.

This reaction can be conveniently carried out by heating the reactants together in the presence of a base such as diethylamine, and then isolating the resulting dyestuffs by conventional methods.

As examples of the compounds of the formula: $hal-A^1(X)_n$ there may be mentioned diethyl chloromalonate, bromomalonodinitrile, chloroacetonitrile, chloroacetone, N-(β - chloroethyl)diethylamine, ethylchloroacetate, chloroacetamide, β-chloroethylamine, γ-bromo-n-propylamine, and β-(ethylsulphonyl)ethylbromide.

One preferred class of the azo dyestuffs of the invention comprises the water-insoluble monoazo dyestuffs of the formula:

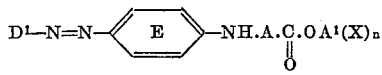

wherein A, A¹, X, n and E have the meanings stated, and D¹ is the radical of a diazo component of the benzene series which is free of azo groups.

Preferably D¹ is a phenyl radical which is optionally substituted by one or more chlorine or bromine atoms or nitro, cyano, lower alkyl, lower alkoxy, lower alkyl sulphonyl, trifluoromethyl or carbo lower alkoxy groups.

A second preferred class of the azo dyestuffs of the invention comprises the water-insoluble monoazo dyestuffs of the formula:

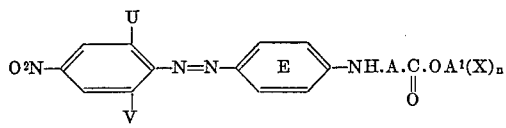

wherein A, A¹, E, X and n have the meanings stated, U represents hydrogen, cyano, nitro, carbo lower alkoxy, bromine, chlorine, trifluoromethyl or lower alkysulphonyl and V represents hydrogen, chlorine, bromine or nitro.

A third preferred class of the dyestuffs of the invention comprises the water-insoluble monoazo dyestuffs of the formula

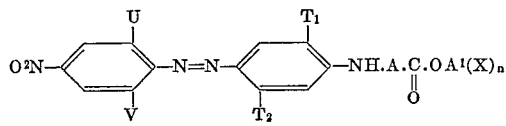

wherein A, A¹, X, n, U and V have the meanings stated above, T¹ represents hydrogen, chlorine, bromine, lower alkyl or lower alkoxy, and T² represents hydrogen, chlorine, lower alkyl, lower alkoxy, or acetylamino.

In the above classes it is further preferred that n represents 1 so that A¹ represents a divalent alkane radical of from 1 to 4 carbon atoms.

The water-insoluble azo dyestuffs of the invention are valuable for colouring synthetic textile materials, for example cellulose acetate and cellulose triacetate textile materials, polyamide textile materials such as polyhexamethyleneadipamide textile matedials, polyacrylonitirile textile materials and preferably aromatic polyester textile materials such as polyethylene terephthalate textile materials. Such textile materials can be in the form of threads, yarn, or woven or knitted fabric. If desired the said synthetic textile materials can be in the form of blends with other textile materials, for example blends of polyester textile materials with cellulose or woolen textile materials.

Such textile materials can be conveniently coloured with the water-insoluble azo dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C. under superatmospheric pressure.

Alternatively the aqueous dispersion of the said azo dyestuff can be applied to the textile material by a padding or printing process, followed by heating at temperatures up to 230° C. depending on the textile material, or by steaming of the textile material. In such processes it is preferred to incorporate a thickening agent, such as gum tragacanth, gum arabic, or sodium alginate, into the aqueous dispersion of the said azo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosuplhite before the soaping treatment in order to remove loosely attached dyestuff from the surface of the textile material.

The azo dyestuffs have excellent affinity and building up properties on synthetic textile materials, and in particular on aromatic polyester textile materials, so enabling deep shades to be obtained. The resulting colorations have excellent fastness to light, to wet treatments, and, in particular to dry heat treatments such as those carried out at high temperatures during pleating operations.

If desired the azo dyestuffs of the invention can be applied to synthetic textile materials in conjunction with other disperse dyes.

The invention is illustrated but not limited by the following examples in which the parts and percentages are by weight.

EXAMPLE 1

1.63 parts of 2-cyano-4-nitroaniline are gradually added to a solution of nitrosylsulphuric acid, which is obtained by adding 0.7 part of sodium nitrite to 8 parts of sulphuric acid monohydrate at a temperature below 35° warming to 70° C. and then cooling to 0° C. at a temperature between 0° and 5° C. The mixture is stirred for 1 hour at 0° to 5° C., poured into a mixture for ice and water, and the mixture filtered.

The resulting solution of the diazo compound is gradually added with stirring to a solution of 3.0 parts of 2-chloro - 5-methyl-N-[β-(β'-acetoxyethoxycarbonyl)ethyl]-aniline and 1 part of urea in 200 parts of acetone, whilst ice is simultaneously added to maintain the temperature of the mixture at 0° to 5° C. The mixture is stirred for ½ hour, and the precipitated dyestuff is then filtered off, washed with water and dried.

When dispersed in aqueous medium the dyestuff so obtained dyes aromatic polyester textile materials in red shades having excellent fastness to light.

EXAMPLE 2

A solution of 0.7 part of sodium nitrite in 50 parts of water is added to a solution of 1.38 parts of p-nitraniline in 10 parts of a concentrated aqueous solution of hydrochloric acid, and the mixture is stirred for 30 minutes at 0° to 5° C. The mixture is then filtered, and sulphamic acid is added to the filtrate to destroy any nitrous acid present. The resulting solution of the diazo compound is gradually added, with stirring, to a solution of 3.0 parts of 2-chloro - 5 - methyl - N-[β-(β'-acetoxyethoxycarbonyl) ethyl]aniline in 200 parts of acetone, whilst ice is simultaneously added to maintain the temperature between 0° and 5° C. The mixture is stirred for 30 minutes and the precipitated dyestuff is then filtered off, washed with water and dried.

When dispersed in aqueous medium the dyestuff so obtained dyes aromatic polyester textile materials in scarlet shades of excellent fastness to light.

EXAMPLE 3

0.7 part of sodium nitrite is added to 8 parts of sulphuric acid monohydrate at a temperature below 35°, the mixture is then warmed to 70° C. and immediately cooled to 0° C. 16 parts of acetic acid and 4 parts of propionic acid are added, followed by a slurry of 2.28 parts of 2-amino-6-methylsulphonylbenzithazole in a mixture of 24 parts of acetic acid and 8 parts of propionic acid, the temperature of the resulting mixture being maintained below 5° C. by external cooling. The mixture is stirred for 2 hours at 0° to 5° C., and is then gradually added to a solution of 2.79 parts of 2:5-dimethyl-N-[β-(ethoxy-carbonylmethoxycarbonyl)ethyl]aniline and 1 part of urea in 200 parts of acetone, ice being simultaneously added to maintain the temperature of the mixture at 0° to 5° C. 500 parts of water are added, the mixture stirred for ½ hour and the precipitated dyestuff is filtered off, washed with water and dried. When dispersed in aqueous medium the dyestuff so obtained dyes aromatic polyester textile materials in bluish-red shades of excellent fastness properties.

The following table gives further examples of the water-insoluble azo dyestuffs of the invention having the formula:

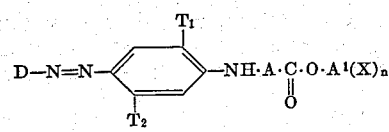

the symbols of which have the values given in the respective columns of the table, and the shades of the dyeings obtained on aromatic polyester textile materials from the said dyestuffs are given in the last column of the table.

The said dyestuffs may be obtained by diazotising the appropriate amines of the formula D–NH$_2$ and coupling the resulting diazo compounds with the appropriate coupling components using methods similar to those described in Examples 1 to 3.

when dispersed in aqueous medium dyes aromatic polyester textile materials in scarlet shades having excellent fastness properties.

Similar dyestuffs are obtained when the 2-chloro-N-(β-carboxyethyl)aniline is replaced by 2-chloro-5-methyl-N-(β-carboxyethyl)aniline and/or the β-(ethylsulphonyl) ethyl bromide is replaced by β-(phenylsulphonyl)ethyl bromide or diethyl bromomalonate.

EXAMPLE 30

A mixture of 2 parts of the azo compound obtained by coupling diazotised p-nitroaniline with 2:5-dimethyl-N-(β-carbomethoxyethyl)aniline, 25 parts of β-cyanoethanol and 0.1 part of tetrabutyltitanate is stired for 4 hours at 120° C. and then for 2 hours at 140° C. The mixture is then poured into water and the precipitated dyestuff is filtered off and dried.

When dispersed in aqueous medium the dyestuff dyes aromatic polyester textile materials in scarlet shades having excellent fastness properties.

A similar dyestuff, giving bluish red shades, is obtained when the azo compound used in the above example is replaced by an equivalent amount of the azo compound obtained by coupling diazotised 2-cyano-4-nitroaniline with 2:5-dimethyl-N-(β-carbomethoxyethyl)aniline.

We claim:
1. Water-soluble azo dyestuff of the formula

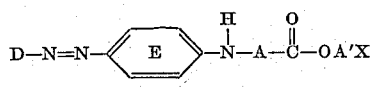

| Example | D | T$^1$ | T$^2$ | A | A$^1$ | X | n | Shade |
|---|---|---|---|---|---|---|---|---|
| 4 | 2-chloro-4-nitrophenol | Bromo | Methyl | Ethylene | Ethylene | Acetoxy | 1 | Red. |
| 5 | 4-sulphonamidonaphth-1-yl | Chloro | Methyl | Ethylene | Ethylene | Acetoxy | 1 | Bluish-red. |
| 6 | 2:6-dichloro-4-sulphonamidophenyl | Chloro | Methyl | Ethylene | Ethylene | Acetoxy | 1 | Yellow. |
| 7 | 2:6-dichloro-4-nitrophenyl | Chloro | Methyl | β-Methyl ethylene | Ethylene | Acetoxy | 1 | Yellowish-brown. |
| 8 | 2:4-dinitro-6-cyanophenyl | Methoxy | Methyl | Ethylene | Ethylene | Acetoxy | 1 | Blue. |
| 9 | 2-trifluoromethyl-4-nitrophenyl | Chloro | Methyl | Ethylene | Ethylene | Acetoxy | 1 | Red. |
| 10 | 5-nitrothiazol-2-yl | Methoxy | Methyl | Ethylene | Methylene | Acetoxy | 1 | Blue. |
| 11 | 5-phenyl-1:3:4-thiadiazol-2-yl | Methyl | Methyl | Ethylene | Methylene | Ethoxycarbonyl | 1 | Bluish-red. |
| 12 | 3-nitro-5-acetylthiophen-2-yl | Methoxy | Methyl | Ethylene | Methylene | Acetoxy | 1 | Blue. |
| 13 | 2-cyano-4-nitrophenyl | Chloro | Methyl | Trimethylene | Methylene | Carbonamido | 1 | Red. |
| 14 | 4-nitrophenyl | Methyl | Methyl | Ethylene | Ethylene | Amino | 1 | Scarlet. |
| 15 | 4-nitrophenyl | Methyl | Methyl | Ethylene | Ethylene | Acetylamino | 1 | Do. |
| 16 | 4-nitrophenyl | Methyl | Methyl | Ethylene | Ethylene | Ethylamino | 1 | Do. |
| 17 | 2-cyano-4-nitrophenyl | Methyl | Methyl | Ethylene | Ethylene | Diethylamino | 1 | Do. |
| 18 | 2-chloro-4-nitrophenyl | Methyl | Methyl | Ethylene | Methylene | Ethoxycarbonyl | 1 | Red. |
| 19 | 2-chloro-4-nitrophenyl | Methyl | Methyl | Ethylene | Methylene | Phenoxycarbonyl | 1 | Red. |
| 20 | 2-chloro-4-nitrophenyl | Methyl | Methyl | Ethylene | Methylene | Benzyloxycarbonyl | 1 | Red. |
| 21 | 2-chloro-4-nitrophenyl | Methyl | Methyl | Ethylene | Methylene | Cyclohexyloxycarbonyl | 1 | Red. |
| 22 | 4-phenylazophenyl | Chlorine | Methyl | Ethylene | Methylene | Acetoxy | 1 | Orange. |
| 23 | 2-carbonamido-4-nitrophenyl | Methoxy | Chlorine | Ethylene | Ethylene | Acetoxy | 1 | Bluish-red. |
| 24 | 2-bromo-4:6-dinitrophenyl | Methoxy | Acetylamino | Ethylene | Ethylene | Acetoxy | 1 | Navy blue. |
| 25 | 2-carbomethoxy-4-nitrophenyl | Methoxy | Methoxy | Ethylene | Ethylene | Acetyl | 1 | Bluish-red. |
| 26 | 4-nitrophenyl | Methyl | Methyl | Ethylene | Methylene | Cyano | 1 | Scarlet. |
| 27 | 4-nitrophenyl | Methyl | Methyl | Ethylene | Methylene | Acetyl | 1 | Do. |
| 28 | 4-nitrophenyl | Methyl | Methyl | Ethylene | Methylene | Carbonamido | 1 | Do. |

EXAMPLE 29

3.95 parts of the sodium salt of the azo compound obtained by coupling diazotised 2-cyano-4-nitroaniline with 2-chloro-N-(β-carboxyethyl)aniline are mixed with 100 parts of ethyl acetate, 5 parts of diethylamine and 2.01 parts of β-(ethylsulphonyl)ethyl bromide are added, and the mixture is stirred for 12 hours at the boil under a reflux condenser. The mixture is filtered and most of the ethyl acetate removed by distillation. The residue is cooled and the dyestuff which separates out is filtered off and dried.

The dyestuff which consists essentially of the compound of the formula:

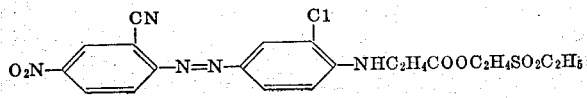

wherein:

D is a benzene radical which can be substituted with 1–3 members selected from the group consisting of cyano, nitro, chlorine, bromine, methyl, methoxy, trifluoromethyl, lower alkyl sulphonyl, carbo lower alkoxy, carbonamido and sulphonamido, said benzene radical being directly linked to the azo portion of the dyestuff through a carbon atom in the benzene ring, A and A' are each independently divalent lower alkane radicals, X is selected from the class consisting of cyano, monocyclic arylsulphonyl, lower alkylsulphonyl, carbo lower alkoxy, monocyclic aryloxycarbonyl, monocyclic aryl lower alkoxycarbonyl, cyclohexyloxycarbonyl, carbonamido, amino, lower alkylamino, di(lower alkyl)amino, lower alkyl carbonyl, lower alkyl carbonyloxy and lower alkyl CONH—, and the benzene ring E can carry up to two substitutents selected from the group consisting of chlorine, lower alkyl, lower alkoxy and —NHCO lower alkyl.

2. The water-insoluble azo dyestuff of claim 1 wherein D is nitrophenyl, A and A' are each ethylene, X is amino and the benzene ring E is substituted with a methyl radical.

References Cited

UNITED STATES PATENTS 3,097,198   7/1963   Fishwick et al. _____ 260—207.1

CHARLES B. PARKER, Primary Examiner

C. F. WARREN, Assistant Examiner

U.S. Cl. X.R.

8—41, 50; 260—152, 158, 196, 207